(12) United States Patent
Fuchs et al.

(10) Patent No.: US 10,283,990 B2
(45) Date of Patent: May 7, 2019

(54) UNIVERSAL CURRENT CHARGER

(71) Applicant: Dr. Ing. h.c. F. Porsche Aktiengesellschaft, Stuttgart (DE)

(72) Inventors: Patrick Fuchs, Leonberg (DE); Christian Jürgens, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 19 days.

(21) Appl. No.: 15/808,103

(22) Filed: Nov. 9, 2017

(65) Prior Publication Data

US 2018/0138730 A1    May 17, 2018

(30) Foreign Application Priority Data

Nov. 16, 2016 (DE) .......................... 10 2016 122 008

(51) Int. Cl.
| *H02J 7/00* | (2006.01) |
| *H02M 7/06* | (2006.01) |
| *B60L 53/14* | (2019.01) |
| *B60L 53/24* | (2019.01) |

(52) U.S. Cl.
CPC ............ *H02J 7/0055* (2013.01); *B60L 53/14* (2019.02); *B60L 53/24* (2019.02); *H02J 7/0027* (2013.01); *H02M 7/06* (2013.01); *B60L 2210/14* (2013.01); *B60L 2210/30* (2013.01); *H02J 2007/0059* (2013.01); *Y02T 10/7005* (2013.01); *Y02T 10/7072* (2013.01); *Y02T 10/7225* (2013.01); *Y02T 10/7241* (2013.01); *Y02T 90/127* (2013.01); *Y02T 90/14* (2013.01)

(58) Field of Classification Search
CPC ... Y02T 90/14; Y02T 10/7005; Y02T 90/128; Y02T 10/7088; Y02T 90/163
USPC ........................................................... 320/109
See application file for complete search history.

(56) References Cited

U.S. PATENT DOCUMENTS

| 5,111,127 A * | 5/1992 | Johnson .................. F02B 63/04 |
| | | 320/101 |
| 8,817,507 B2 | 8/2014 | Liu et al. |
| 9,238,415 B2 | 1/2016 | King et al. |
| 2015/0042159 A1 | 2/2015 | Kim et al. |
| 2017/0179745 A1 | 6/2017 | Tritschler et al. |

FOREIGN PATENT DOCUMENTS

| DE | 102011083020 A1 | 3/2013 |
| DE | 102011118957 A1 | 5/2013 |
| DE | 102013225493 A1 | 2/2015 |
| DE | 102014217703 A1 | 3/2016 |
| EP | 2542439 B1 | 12/2014 |
| EP | 2875984 A2 | 5/2015 |
| JP | 2000134720 A | 5/2000 |

OTHER PUBLICATIONS

German Search Report for German Application No. 10 2016 122 008.6 dated Jan. 4, 2017, with partial English translation—7 Pages.

* cited by examiner

*Primary Examiner* — Arun C Williams
(74) *Attorney, Agent, or Firm* — RatnerPrestia (57) ABSTRACT

A charger for a motor vehicle and to a method for charging an energy store of the motor vehicle.

10 Claims, 6 Drawing Sheets

UNIVERSAL CURRENT CHARGER

CROSS-REFERENCE TO RELATED APPLICATIONS

This application claims priority to German Patent Application No. 10 2016 122 008.6, filed Nov. 16, 2016, which is incorporated by reference herein in its entirety.

FIELD OF THE INVENTION

The invention relates to a charger for a motor vehicle and to a method for charging an energy store of the motor vehicle.

BACKGROUND OF THE INVENTION

A motor vehicle which has and uses at least one electric motor for driving or propelling said motor vehicle, is referred to as an electric vehicle or hybrid vehicle. In this context, the at least one electric motor is to be supplied with electrical energy during a driving mode of the motor vehicle from at least one electrical energy store, which can also be referred to as a battery or accumulator. This at least one electrical energy store can be, for example, a high-voltage battery. The latter is to be supplied in turn with electrical energy in a charging mode. The high-voltage battery can be charged from an external power grid via a charging socket. However, since the infrastructure for the accessible power grid is very different depending on the locality, according to the current state of the art a high-voltage booster for charging with direct current (DC charging) and an on-board charger (OBC) for charging with alternating current (AC charging) are provided in every vehicle. The two components transform the incoming current to the direct current which is required to charge the battery and which has, for example, a voltage of 800 V. It would be desirable to combine the functions of the high-voltage booster and of the on-board charger in a single vehicle charger instead of having two separate units.

DE 10 2011 118 957 A1, which is incorporated by reference herein, describes an electrically driven vehicle with two charging sockets. The charging sockets can be embodied as a pure AC socket or DC socket or as a combined AC/DC socket.

JP 2000/134720 A, which is incorporated by reference herein, discloses an electrically driven vehicle which can be charged with AC or DC current. Separate circuits for AC current and DC current are respectively provided.

DE 10 2013 225 493 A1, which is incorporated by reference herein, discloses an electrically driven vehicle which charges the high-voltage battery with alternating current via an on-board charger. A DC/DC voltage converter which is connected to the OBC is provided for charging a second low-voltage battery.

EP 2 542 439 B1, which is incorporated by reference herein, also describes a vehicle which can be charged with AC current or DC current and in which separate circuits for AC current and DC current are respectively provided. The voltage of the DC power source must correspond to the voltage which is required for charging the high-voltage battery.

EP 2 875 984 A2 (U.S. Pat. No. 9,238,415 B2), which is incorporated by reference herein, discloses an electrically driven vehicle which can be charged simultaneously with AC current and DC current. What is referred to as an inverter charging system is disclosed in which the main charging current is supplied by the DC power source, and the AC power source supplies a correction current which reduces the harmonics in the charging current and permits a high level of efficiency to be achieved. The voltage of the DC power source must correspond to the voltage which is required for charging the high-voltage battery.

SUMMARY OF THE INVENTION

Against this background, an object of the present invention is to make available a charger which combines the functions of the high-voltage booster and of the on-board charger in one circuit.

This object is achieved by means of the features of the independent patent claim for a charger. Refinements of the charger can be found in the dependent patent claims and the description.

The charger according to aspects of the invention has two inputs (AC and DC), wherein an input filter and a rectifier are connected downstream of the AC connection. This is then followed by a selector switch at which the DC current is directly present and which can be switched between oscillating current (AC) and direct current (DC). Finally, a boost converter is provided which generates the necessary voltage, e.g. 800 V, for the high-voltage battery. If a battery is used whose rated voltage is less than $\sqrt{2}$-times the voltage used±tolerance, instead of the boost converter a buck-boost converter is used. Given a rated voltage of 400 V, this would be the case at a rated voltage of ≤600 V. In this context, variants with or without electrical isolation are possible, wherein the electrical isolation can be brought about e.g. by means of a transformer with an AC section or in the boost converter or in the buck-boost converter.

In one embodiment, the charger according to aspects of the invention can process as an input current a single-phase to three-phase alternating current in the voltage range from 150 to 600 V or direct current in the voltage range from 400 to 800 V. In one embodiment, the charger supplies direct current with a voltage of 800 V as the output current. In another embodiment, the charger supplies direct current with a voltage of less than 600 V as the output current. The specified voltage ranges are ultimately understood as exemplary and correspond to currently customary voltage ranges. However, other ranges are also possible; there are no technical restrictions here.

In one embodiment, the charger according to aspects of the invention has a charging socket for a single-phase to three-phase alternating current, which charging socket is connected to an input filter and a rectifier. The rectifier is connected to a selector switch. The charger also has a charging socket for direct current, which charging socket is also connected to the selector switch. Connected downstream of the selector switch is a boost converter which converts the incoming direct current to an output voltage of at least 600 V in order to charge the connected high-voltage battery. In one embodiment, a bypass switch is provided in the boost converter, which bypass switch is closed if the charger is connected to a DC charging station which can provide the rated voltage of the high-voltage battery. As a result, the efficiency of the charging process is increased when a boost mode is not necessary. If the rated voltage of the high-voltage battery is less than 600 V, the boost converter is replaced by a buck-boost converter which generates the output voltage which is required for charging the high-voltage battery. The voltage values which are specified for this embodiment are related to a mains voltage of AC 400 V. If another mains voltage is used, the values must be correspondingly adapted.

In another embodiment, the charger according to aspects of the invention has electrical isolation in the AC path. In this embodiment, a docked transformer is connected between the rectifier and the selector switch.

In a further embodiment, the charger according to aspects of the invention has electrical isolation in the DC/DC converter, i.e. a clocked transformer in the boost converter or buck-boost converter. In this embodiment, a jumper is provided which connects the direct current input of the selector switch to the output of the boost converter or buck-boost converter. The jumper is closed if the charger is connected to a DC charging station which has high power and which can provide the rated voltage of the high-voltage battery. The presence of the jumper has the advantage that the DC/DC converter only has to be configured for converting its input voltage into the rated voltage of the high-voltage battery and does not also have to be converted to transmit a direct-voltage charging current which already has the rated voltage of the high-voltage battery.

The charger according to aspects of the invention is designed to charge an electrical energy store. This charger is to be used in a motor vehicle, and is used to charge an electrical energy store of the motor vehicle.

This charger comprises electronic components, for example diodes such as rectifier diodes, inductance elements such as coils, capacitance elements such as capacitors, resistors, selector switches and semiconductor switches, e.g. bipolar transistors or field-effect transistors. Examples are metal-oxide semiconductor field-effect transistors (MOSFET) and bipolar transistors with an insulated gate electrode (IGBT). In some embodiments, the charger also contains at least one transformer.

The subject matter of the present invention is also a method for charging an electrical energy store of a motor vehicle, in which the charger according to aspects of the invention is used.

In order to charge an electrical energy store, embodied as a high-voltage battery, of the motor vehicle which is usually referred to as a so-called plug-in vehicle and is embodied as a hybrid vehicle or electric vehicle, the electrical energy store is connected to a stationary power source via the charger which is being presented. The stationary power source can be, for example, the stationary power grid or an energy store, e.g. a battery. The charger which is arranged in the motor vehicle is designed to permit, within the scope of the method, the charging process or charging operation for charging the electrical energy store with a multiplicity of different power sources and to process a large range of different input voltages. In this way, alternating current sources with one to three phases and a voltage in, for example, the range from 150 to 600 V, as well as direct current sources with a voltage in, for example, a range from 400 to 800 V, can be used as a power source for the charging process.

Further advantages and refinements of the invention can be found in the description and the appended drawing.

Of course, the features which are presented above and those which are still to be explained below can be used not only in the respectively specified combination but also in other combinations or alone without departing from the scope of the present invention.

BRIEF DESCRIPTION OF THE DRAWINGS

The invention is illustrated schematically on the basis of embodiments in the drawings and is described schematically and in detail with reference to the drawings, in which.

DETAILED DESCRIPTION OF THE INVENTION

FIGS. 1-6 are described in a coherent and general fashion. Identical reference symbols denote the same components.

Figure 1:
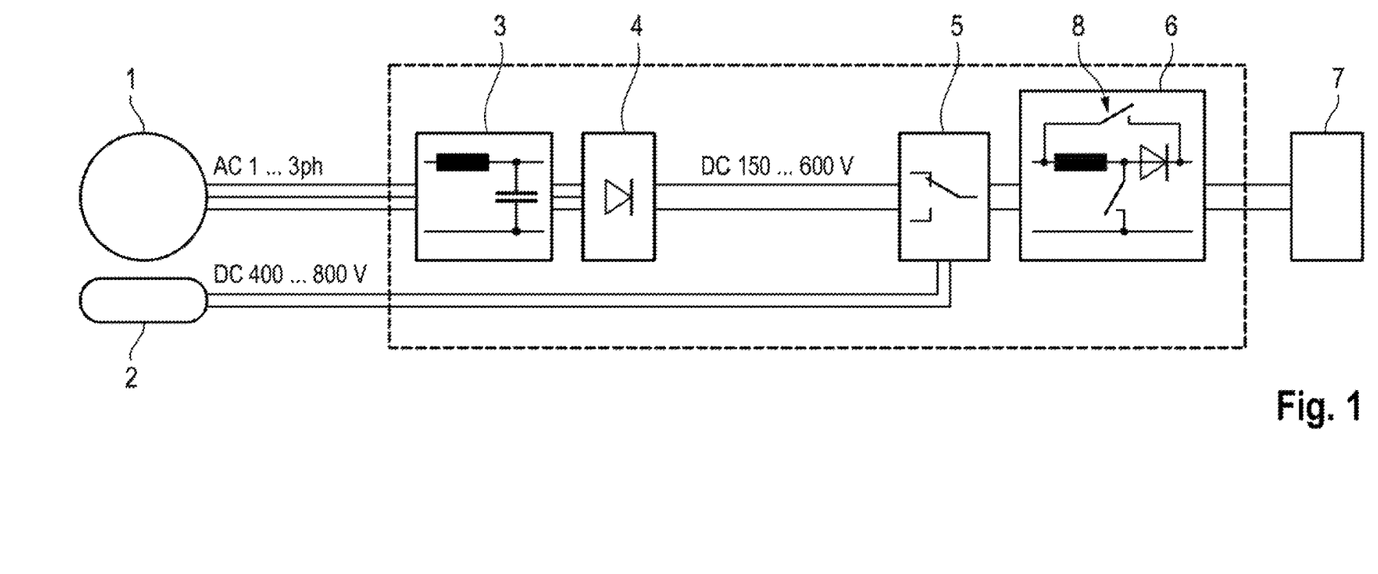
FIG. 1 shows a schematic illustration of an embodiment of the charger according to aspects of the invention.

In the embodiment depicted in FIG. 1, the charger has a charging socket 1 for single-phase to three-phase alternating current, which charging socket 1 is connected to an input filter 3 and a rectifier 4. The rectifier 4 is connected to a selector switch 5. The charger also has a charging socket 2 for direct current, which charging socket 2 is also connected to the selector switch 5. Connected downstream of the selector switch 5 is a boost converter 6 which converts the incoming direct current to an output voltage of at least 600 V in order to charge the connected high-voltage battery 7. In one embodiment, a bypass switch 8 is provided in the boost converter 6, which bypass switch is closed if the charger is connected to a DC charging station which can provide the rated voltage of the high-voltage battery 7. As a result, the efficiency of the charging process is increased when boost mode is not necessary. If the rated voltage of the high-voltage battery is less than 600 V, the boost converter 6 is replaced by a buck-boost converter. The voltage limiting value of 600 V specified here is to be understood as exemplary and relates to an alternating voltage of 400 V as a mains voltage. When other mains voltages are used this value is to be correspondingly adapted.

Figure 2:
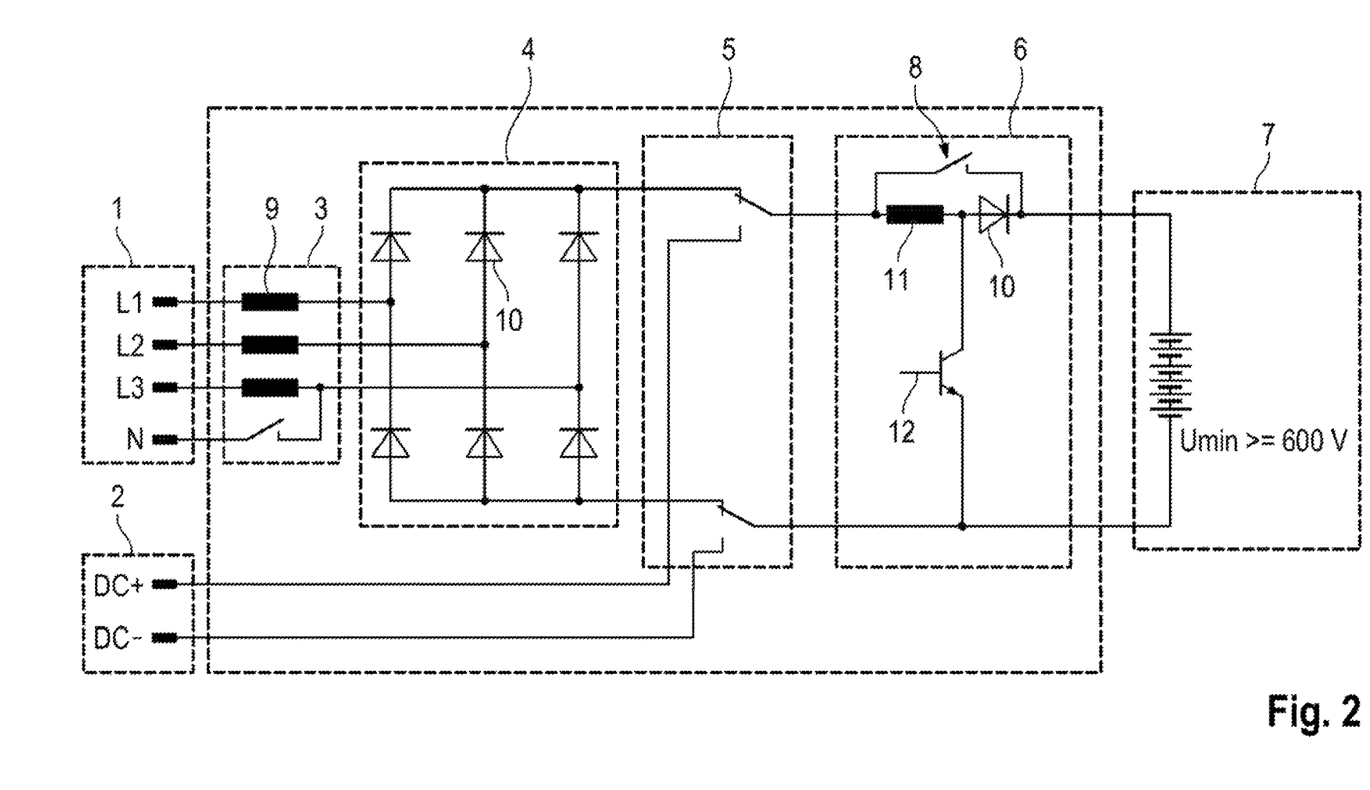
FIG. 2 shows a circuit diagram of the embodiment in FIG. 1.

FIG. 2 illustrates a schematic circuit diagram of this embodiment. Connected downstream of the charging socket 1 for a single-phase to three-phase alternating current is a mains filter 3 which is implemented with LC elements 9. The filtered oscillating current is converted into direct current in the rectifier 4. The rectifier 4 is implemented with six rectifier diodes 10. The selector switch 5 is connected at one end to the rectifier 4 and at the other to the charging socket 2 for direct current. The direct current which is fed via the rectifier 4 or the charging socket 2 depending on the position of the selector switch 5 is converted in the boost converter 6 to the voltage which is required for charging the high-voltage battery 7. In the embodiment illustrated in FIG. 2, the boost converter 6 comprises an inductor 11, a freewheeling diode 10 and a bipolar transistor 12. Bypass switch 8 in the boost converter 6 permits the boost converter 6 to be bypassed if the charger is connected to a DC charging station which can provide the rated voltage of the high-voltage battery 7.

Figure 3:
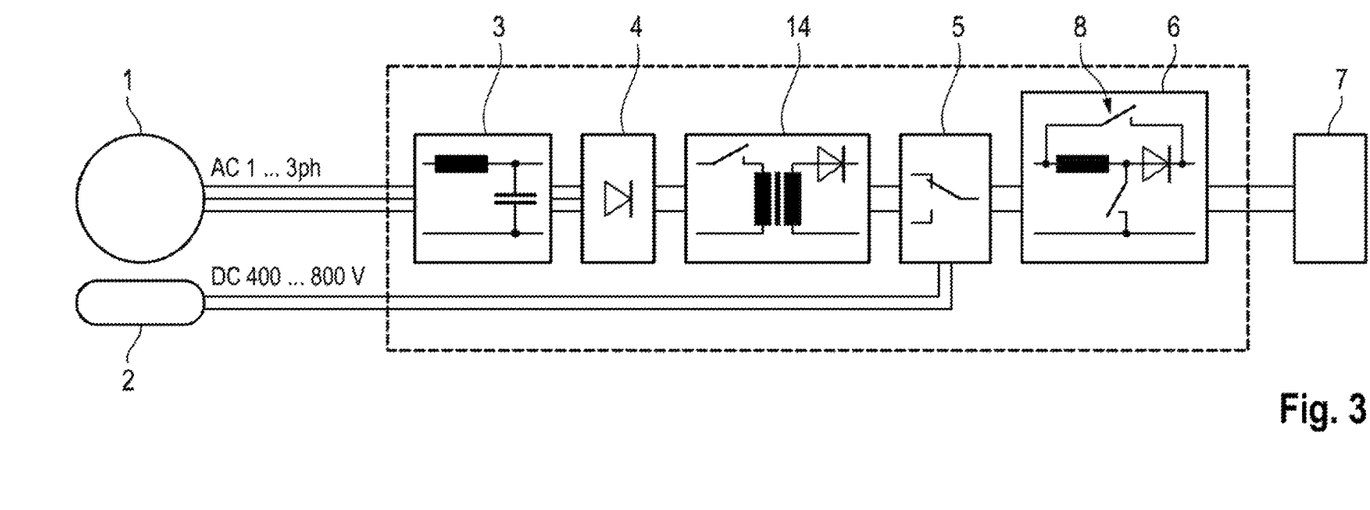
FIG. 3 shows a schematic illustration of another embodiment of the charger according to aspects of the invention.

In the embodiment shown in FIG. 3, the charger according to aspects of the invention has electrical isolation in the AC path. In this embodiment, a clocked transformer 14 is connected between the rectifier 4 and the selector switch 5.

Figure 4:
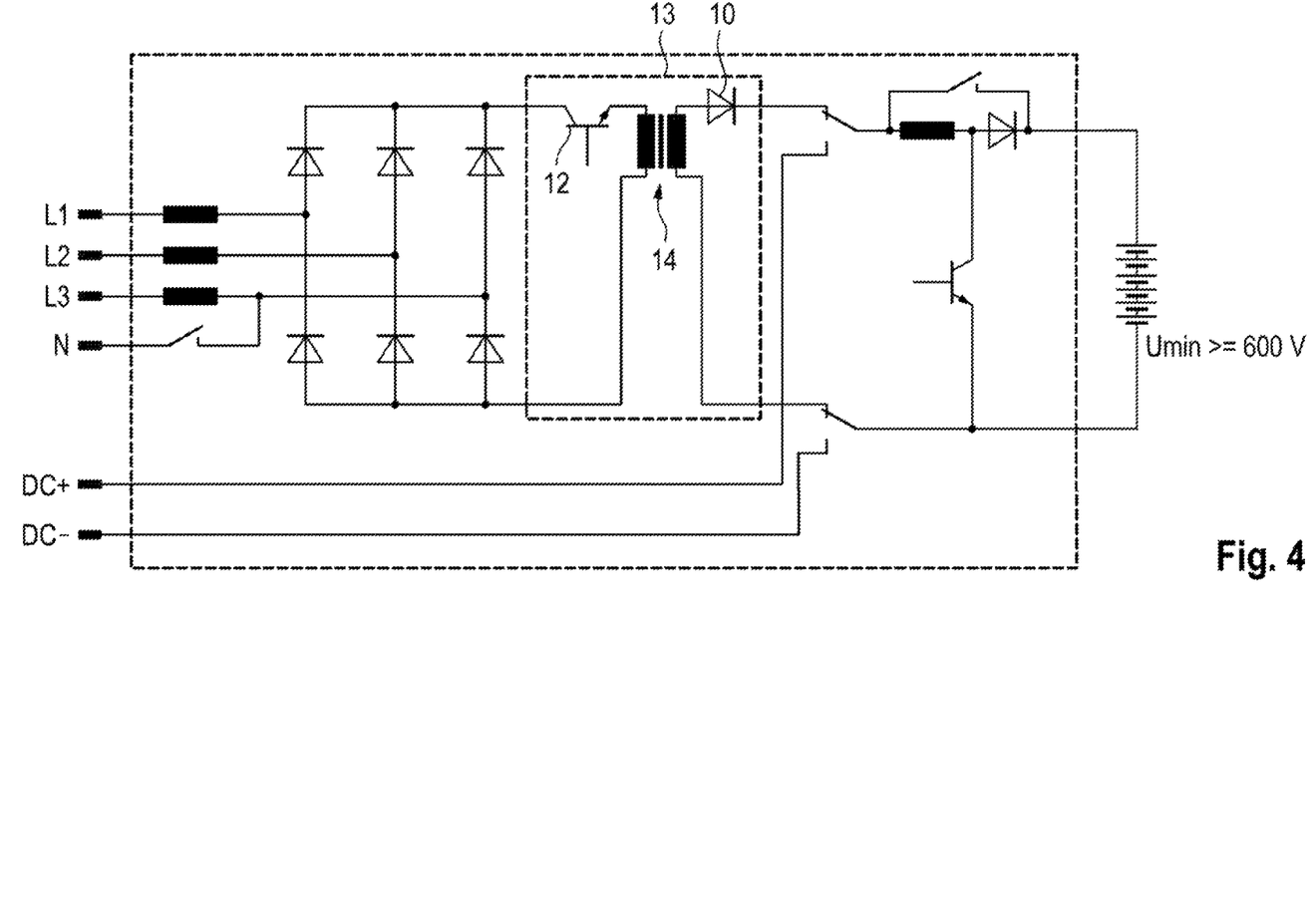
FIG. 4 shows a circuit diagram of the embodiment in FIG. 3.

FIG. 4 illustrates a circuit diagram of this embodiment. Connected downstream of the charging socket 1 for single-phase to three-phase alternating current is a mains filter 3 which is implemented with LC elements 9. The filtered alternating current is converted into direct current in the rectifier 4. The rectifier 4 is implemented with six rectifier diodes 10. Connected downstream of the rectifier is a clocked transformer 13 which comprises a bipolar transistor 13, a transformer 14 (or a reactor with two windings) and a diode 10. The selector switch 5 is connected at one end to the clocked transformer 13 and at the other end to the charging socket 2 for direct current. The direct current which is fed via the rectifier 4 or the charging socket 2 depending on the position of the selector switch 5 is converted in the boost converter 6 to the voltage which is required for charging the high-voltage battery 7. In the embodiment illustrated in FIG. 4, the boost converter 6 comprises an inductance 11, a free-wheeling diode 10 and a bipolar transistor 12. Bypass switch 8 in the boost converter 6 permits the boost converter 6 to be bypassed if the charger is connected to a DC charging station which can provide the rated voltage of the high-voltage battery 7.

Figure 5:
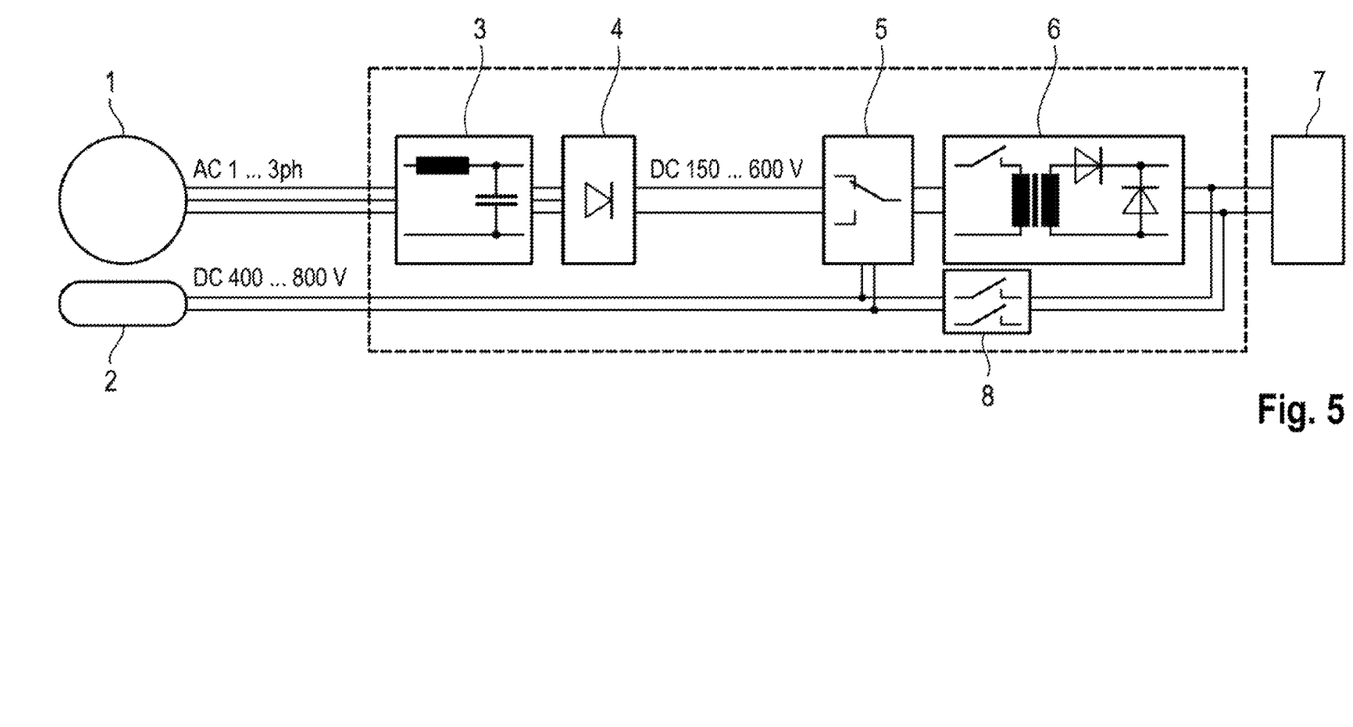
FIG. 5 shows a schematic illustration of a further embodiment of the charger according to aspects of the invention.

In the embodiment shown in FIG. 5, the charger according to aspects of the invention has electrical isolation in the DC/DC converter, i.e. in the boost converter (or buck-boost converter) 6. In this embodiment, a jumper 8 is provided which connects the direct current input of the selector switch 5 to the output of the boost converter (or buck-boost converter) 6. The jumper 8 is closed if the charger is connected to a DC charging station which has high power and can provide the rated voltage of the high-voltage battery 7.

Figure 6:
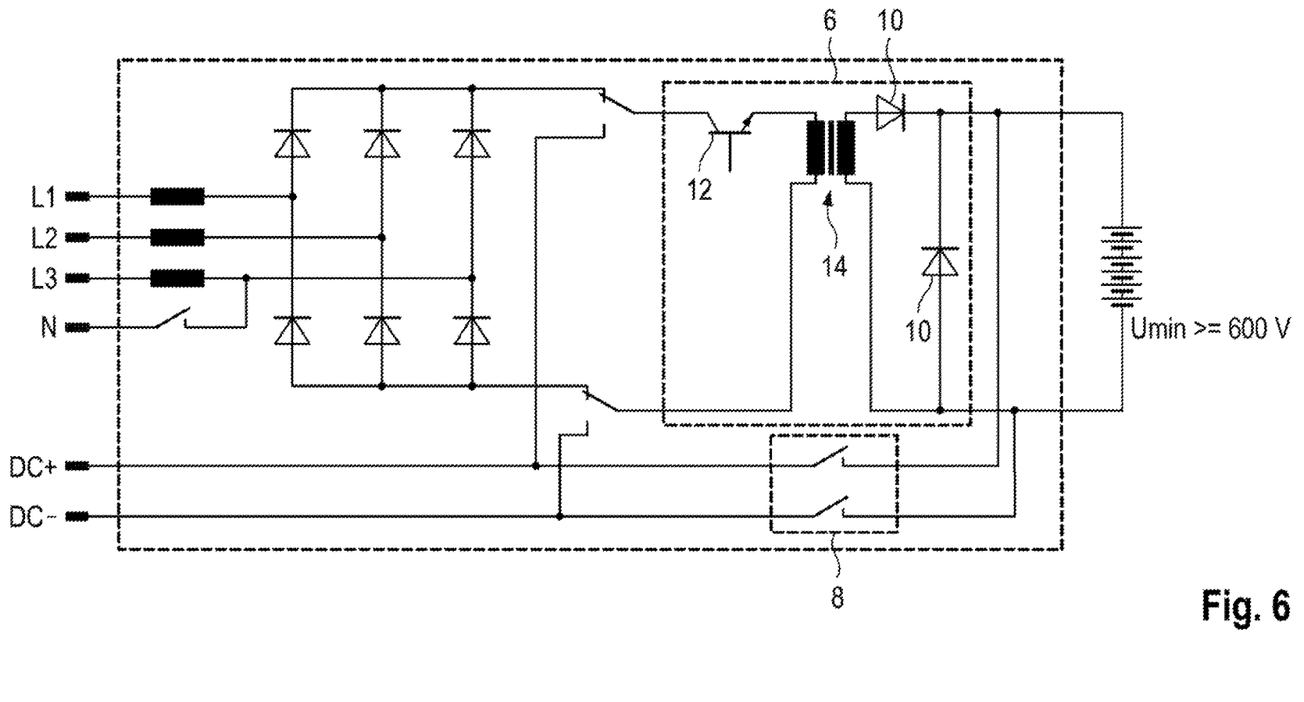
FIG. 6 shows a circuit diagram of the embodiment in FIG. 5.

FIG. 6 illustrates a schematic circuit diagram of this embodiment. Connected downstream of the charging socket 1 for single-phase to three-phase alternating current is a mains filter 3 which is implemented with LC elements 9. The filtered alternating current is converted into direct current in the rectifier 4. The rectifier 4 is implemented with six rectifier diodes 10. The selector switch 5 is connected at one end to the rectifier 4 and at the other end to the charging socket 2 for direct current. The direct current which is fed via the rectifier 4 or the charging socket 2 depending on the position of the selector switch 5 is converted in the boost converter 6 to the voltage which is required for charging the high-voltage battery 7. In the embodiment illustrated in FIG. 6, the boost converter 6 comprises a bipolar transistor 12, a transformer 14 and two diodes 10. The jumper 8 connects the direct current input of the selector switch 5 to the output of the boost converter 6 or connects the charging socket 2 directly to the high-voltage battery 7.

What is claimed is:

1. A charger or charging an electrical energy stare, the charger comprising:
   at least one alternating current (AC) charging socket for a receiving an inputted phased AC, wherein the inputted phased AC is a single-phase AC to a three-phase AC;
   a direct current (DC) charging socket for receiving an inputted DC;
   a mains filter connected to the AC charging socket, the mains filter including a plurality of inductor-capacitor (LC) circuits, each of the LC circuits to filter a respective phase of the inputted phased AC to produce a respective filtered AC phase;
   a rectifier connected to the mains filter, the rectifier including a plurality of diode pairs, each of the diode pairs connected to a respective LC circuit to receive the respective filtered AC phase and convert the respective filtered AC phase, to produce a converted DC;
   a clocked transformer connected between the rectifier and the selector switch for electric isolation in an AC path followed by the inputted AC to the converted DC, the clocked transformer including a first bipolar transistor, a transformer, and a diode;
   a selector switch connected to the clocked transformer to receive the converted DC and connected to the DC charging socket to receive the inputted DC, wherein the selector switch selects between the converted DC and the inputted DC to produce a selected DC signal; and
   a DC/DC converter connected to the selector switch to convert the selected DC signal from the selector switch into a rated voltage DC output to charge the electrical energy store, the DC/DC converter including an inductor, a free-wheeling diode, and a second bipolar transistor, wherein the second bipolar transistor is for electrical isolation in a DC path followed by the inputted DC.

2. The charger as claimed in claim 1, in which the DC/DC converter is a boost converter.

3. The charger as claimed in claim 1, in which the DC/DC converter is a buck-boost converter.

4. The charger as claimed in claim 1, further comprising:
   at least one bypass switch connected in parallel with the DC/DC converter that bypasses the DC/DC converter when the inputted DC matches a rated voltage of the electrical energy store and selects the inputted DC to produce the selected DC signal.

5. The charger as claimed in claim 1, wherein the charger is configured for use in a motor vehicle.

6. A method for charging an electrical energy store, implemented as a high-voltage battery, of a motor vehicle, in which the electrical energy store is connected to a stationary power source via a charger as claimed in claim 1, wherein the method comprises:
   charging the motor vehicle using the charger.

7. The method as claimed in claim 6, wherein the stationary power source is a stationary power grid.

8. The method as claimed in claim 7, wherein the stationary power grid supplies the single-phase AC to the three-phase AC with a voltage in a range from 150 to 600 V.

9. The method as claimed in claim 6, wherein the stationary power source supplies the inputted direct current (DC) with a voltage in a range from 400 to 800 V.

10. A charger for charging an electrical energy store, the charger comprising:
    at least one alternating current (AC) charging socket for a receiving an inputted phased AC, wherein the inputted phased AC is a single-phase AC to a three-phase AC;
    a direct current (DC) charging socket for receiving an inputted DC;
    a mains filter connected to the AC charging socket, the mains filter including a plurality of inductor-capacitor (LC) circuits, each of the LC circuits to filter a respective phase of the inputted phased AC to produce a respective filtered AC phase;
    a rectifier connected to the mains filter, the rectifier including a plurality of diode pairs, each of the diode pairs connected to a respective LC circuit to receive the respective filtered AC phase and convert the respective filtered AC phase, to produce a converted DC;
    a selector switch connected to the rectifier to receive the converted DC and connected to the DC charging socket to receive the inputted DC, wherein the selector switch selects between the converted DC and the inputted DC to produce a selected DC signal;

a DC/DC converter connected to the selector switch to convert the selected DC signal from the selector switch into a rated voltage DC output to charge the electrical energy store, the DC/DC converter including a bipolar transistor, a transformer, and two diodes; and a jumper connected to receive the converted DC produced from the rectifier, connected to the DC charging socket to receive the inputted DC, and connected to the electrical energy store, wherein:

the jumper closes to connect the converted DC to the electrical energy store, and the jumper closes to directly connect the inputted DC to the electrical energy store when the inputted DC matches a rated voltage of the electrical energy store.

\* \* \* \* \*

UNITED STATES PATENT AND TRADEMARK OFFICE
CERTIFICATE OF CORRECTION

PATENT NO. : 10,283,990 B2  
APPLICATION NO. : 15/808103  
DATED : May 7, 2019  
INVENTOR(S) : Patrick Fuchs and Christian Jürgens Page 1 of 1

It is certified that error appears in the above-identified patent and that said Letters Patent is hereby corrected as shown below:

In the Claims

Column 5, Line 50, Claim 1, should read --A charger for charging an electrical energy store, the--.

Column 5, Line 53, Claim 1, should read --receiving an inputted phased AC, wherein the input--.

Column 6, Line 48, Claim 10, should read --receiving an inputted phased AC, wherein the input--.

Signed and Sealed this  
Third Day of September, 2019

Andrei Iancu  
*Director of the United States Patent and Trademark Office*